(12) United States Patent
Colegrove et al.

(10) Patent No.: US 7,703,785 B2
(45) Date of Patent: Apr. 27, 2010

(54) BICYCLE DERAILLEUR SYSTEM

(75) Inventors: James Colegrove, Lake Mills, WI (US); Dylan Howes, Monona, WI (US); Jose Gonzalez, Santa Clarita, CA (US)

(73) Assignee: Trek Bicycle Corporation, Waterloo, WI (US)

( * ) Notice: Subject to any disclaimer, the term of this patent is extended or adjusted under 35 U.S.C. 154(b) by 195 days.

(21) Appl. No.: 11/839,931

(22) Filed: Aug. 16, 2007

(65) Prior Publication Data

US 2009/0045601 A1 Feb. 19, 2009

(51) Int. Cl.
*B62M 1/02* (2006.01)
(52) U.S. Cl. .................. 280/260; 280/284; 474/80; 474/119; 474/122
(58) Field of Classification Search ............. 280/284, 280/260; 474/80, 102–129
See application file for complete search history.

(56) References Cited

U.S. PATENT DOCUMENTS

| | | | |
|---|---|---|---|
| 4,260,657 A | 4/1981 | Loyd et al. | |
| 5,121,937 A | 6/1992 | Lawwill | |
| 5,215,322 A | 6/1993 | Enders | |
| 5,226,674 A | 7/1993 | Buell et al. | |
| 5,244,224 A | 9/1993 | Busby | |
| 5,271,879 A | 12/1993 | Seatchi et al. | |
| 5,452,910 A | 9/1995 | Harris | |
| 5,498,211 A * | 3/1996 | Hsu | 474/80 |
| 5,509,679 A | 4/1996 | Leitner | |
| 5,624,519 A | 4/1997 | Nelson et al. | |
| 5,628,524 A * | 5/1997 | Klassen et al. | 280/284 |
| 5,678,837 A | 10/1997 | Leitner | |
| 5,685,553 A | 11/1997 | Wilcox et al. | |
| 5,899,480 A | 5/1999 | Leitner | |
| 5,901,974 A | 5/1999 | Busby et al. | |
| 5,921,572 A | 7/1999 | Bard et al. | |
| 5,957,473 A | 9/1999 | Lawwill | |
| 6,036,213 A * | 3/2000 | Busby | 280/284 |
| 6,102,421 A | 8/2000 | Lawwill et al. | |
| 6,109,636 A | 8/2000 | Klein et al. | |
| 6,109,638 A | 8/2000 | Colegrove | |
| 6,131,934 A | 10/2000 | Sinclair | |

(Continued)

FOREIGN PATENT DOCUMENTS

DE 20217875 U1 6/2003

OTHER PUBLICATIONS

Fudge, Jack,Hexcel Research and Technology, "HexMC™—Composites In 3D (A New High Performance Molding Compound," 2000 (13 pages).

(Continued)

*Primary Examiner*—Lesley Morris
*Assistant Examiner*—Michael R Stabley
(74) *Attorney, Agent, or Firm*—Boyle Fredrickson, S.C.

(57) ABSTRACT

A bicycle derailer assembly that is mounted concentrically with an axle of a rear wheel assembly. The derailer is constructed to be mounted to the bicycle such that the derailer is pivotable about a common axis with the rear wheel and such that the rear wheel can be removed from the bicycle without interfering with the connection of the derailer to the bicycle. The derailer system provides a derailer that is robust and reduces interference of the derailer with the performance of bicycle maintenance.

13 Claims, 9 Drawing Sheets

U.S. PATENT DOCUMENTS

| | | | |
|---|---|---|---|
| 6,161,858 | A | 12/2000 | Tseng |
| 6,164,676 | A | 12/2000 | Wilcox |
| 6,170,845 | B1 | 1/2001 | Tseng |
| 6,199,886 | B1 | 3/2001 | Guenther |
| 6,244,610 | B1 | 6/2001 | Kramer-Massow |
| 6,270,104 | B1 | 8/2001 | Nelson et al. |
| 6,277,463 | B1 | 8/2001 | Hamilton et al. |
| 6,293,574 | B1 | 9/2001 | Storck |
| 6,378,885 | B1 | 4/2002 | Ellsworth et al. |
| 6,439,593 | B1 | 8/2002 | Tseng |
| 6,450,520 | B1 | 9/2002 | Girard |
| 6,471,230 | B2 | 10/2002 | Ellsworth et al. |
| 6,595,538 | B2 | 7/2003 | Ellsworth et al. |
| 6,712,373 | B2 | 3/2004 | Chamberlain et al. |
| 6,740,003 | B2 * | 5/2004 | Fukuda .................. 477/78 |
| 6,845,998 | B2 * | 1/2005 | Probst .................. 280/284 |
| 6,866,281 | B2 | 3/2005 | Chamberlain et al. |
| 6,877,591 | B1 | 4/2005 | Hso |
| 6,880,847 | B2 | 4/2005 | Chamberlain et al. |
| 6,924,021 | B1 * | 8/2005 | Colegrove et al. ............ 428/81 |
| 6,926,298 | B2 | 8/2005 | Ellsworth et al. |
| 6,953,202 | B2 | 10/2005 | Chamberlain et al. |
| 6,955,373 | B2 | 10/2005 | Chang |
| 7,033,294 | B2 * | 4/2006 | Chamberlain et al. ......... 474/80 |
| 7,048,292 | B2 * | 5/2006 | Weagle .................. 280/285 |
| 7,052,028 | B2 | 5/2006 | Chamberlain |
| 7,052,029 | B2 * | 5/2006 | Chamberlain ............... 280/284 |
| 7,059,620 | B2 | 6/2006 | Chamberlain et al. |
| 7,128,329 | B2 | 10/2006 | Weagle |
| 7,396,304 | B2 * | 7/2008 | Shahana .................. 474/82 |
| 2004/0116222 | A1 * | 6/2004 | Shahana et al. ............. 474/82 |
| 2006/0022429 | A1 | 2/2006 | Ellsworth et al. |
| 2006/0061059 | A1 * | 3/2006 | Lesage et al. ............... 280/284 |
| 2006/0119070 | A1 | 6/2006 | Weagle |
| 2006/0225942 | A1 | 10/2006 | Weagle |
| 2007/0024022 | A1 | 2/2007 | Weagle |

OTHER PUBLICATIONS

"HexMC™ Moulding Compound" Product Data, 2000 (7 pages).
Hexcel Composite Materials "What is HexMC?" data sheets (7 pages).
http://www.ktm-bikes.at/2007/eu/detailBike.php?Bike=prowlerat1&kat—Dirt (1 page).
http://www.split-pivot.com/ (1 page).
WP Racing Importers of White Power Suspension (1 page).
Suzuki Launches Full-Floaters (2 pages).
http://ssp.cube-bikes.de/zoom07/zoom.html?stereo_black_1_detail_zoom (2 pages).
http://www.storck-bicycle.de/mbd/img/data_gallerie_77.jpg (1 page).

* cited by examiner

BICYCLE DERAILLEUR SYSTEM

BACKGROUND OF THE INVENTION

The present invention relates generally to bicycles and, more particularly, to a rear wheel suspension system and a derailleur assembly of a bicycle.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket, the bottom bracket usually comprising a cylindrical member for supporting the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from the top of the seat tube. The chain stays and seat stays are normally joined together with a rear dropout for supporting the rear axle of the rear wheel. The portion of the frame defined by the head tube, seat post and bottom bracket and the structural members that join those three items together can be referred to as the main front triangular portion of the frame, with the seat stays and chain stays defining a rear triangular portion of the frame. The foregoing description represents the construction of a conventional bicycle frame which of course does not possess a suspension having any shock absorbing characteristics.

The increased popularity in recent years of off-road cycling, particularly on mountains and cross-country, has made a shock absorbing system in many instances a biking necessity. A bicycle with a properly designed suspension system is capable of traveling over extremely bumpy, uneven terrain and up or down very steep inclines. Suspension bicycles are less punishing, reduce fatigue and reduce the likelihood of injury to the rider, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on conventional non-suspension bicycles. Over the last several years the number of bicycles now equipped with suspension systems has dramatically increased. In fact, many bicycles are now fully suspended, meaning that the bicycle has both a front suspension and a rear suspension. Front suspensions were the first to become popular. Designed to remove the pounding to the bicycle front end, the front suspension is simpler to implement than a rear suspension. A front suspension fork is easy to retrofit onto an older model bicycle. On the other hand, a rear suspension will increase traction and assist in cornering and balance the ride.

During cycling, as the bicycle moves along a desired path, discontinuities of the terrain are communicated to the assembly of the bicycle and ultimately to the rider. Although such discontinuities are generally negligible for cyclists operating on paved surfaces, riders venturing from the beaten path frequently encounter such terrain. With the proliferation of mountain biking, many riders seek the more treacherous trail. Technology has developed to assist such adventurous riders in conquering the road less traveled. Wheel suspension systems are one such feature.

Riding a fully suspended mountain bike along a rough, rock strewn trail, or even level riding on city and country roads, provides a new degree of safety and comfort to the rider. It is in downhill riding and racing that a rear suspension is most beneficial, but even on ordinary city and country roads, a rear suspension allows the rider to maintain a forward facing orientation to more safely view traffic and road conditions without paying disproportionate attention to stones and potholes immediately below in the rider's path. A number of pivoting "swing arm" suspensions have been developed for rear wheel suspensions on bicycles. In its simplest configuration, the chain stays, which on a conventional bicycle frame are rigidly mounted, are replaced by a pair of swing arms that are pivotably attached at their front ends to the generally fixed front triangular portion of the frame. The pivot is usually located near the bottom bracket where the pedal and crank are supported. The rear ends of the swing arms, which support the rear axle, move upward and downward in response to the rear wheel striking rocks, curbs and other obstructions. The range of movement of the swing arm usually is controlled by a shock absorber affixed between the swing arm and the main front frame. Although such systems have allowed riders to conquer more aggressive terrain, room for improvement still exists.

Many riders appreciate that braking on mountain bikes can feel "chattery", or as though the wheel is skipping over the terrain rather than rolling thereover. This chatter can detract from rider comfort and confidence as well as adversely affect bicycle performance. During normal operation, as the wheel moves across the ground, a contact patch of the tire is defined as the area of the tire that engages the ground surface. During translation of the suspension system relative to the frame, the contact patch rotates about the tire relative to an axis of rotation of the tire. Typically, the contact patch rotates 10 to 23 degrees for bikes having a suspension which travel ranging from about 122 to approximately 180 millimeters. Other suspension systems provide contact patch rotation in the range of 7 to 12 degrees for bicycles having 120 to 250 millimeters of suspension travel. Rotation of the contact patch contributes to the operational chatter perceived by the rider. Accordingly, it is desired to provide a suspension system having a reduced contact patch rotation.

Braking forces also affect operation of the suspension system. Braking forces can cause the suspension system to compress or extend based, in part, on the orientation of the brake system with respect to the movable links of the suspension and/or the fixed portion constructed to support the rider. Improper association of the brake system with the rear wheel and the movable members of the suspension system can detrimentally affect bicycle performance as well as stopping ability. During braking, rider momentum generates a forward weight shift which acts to compress the front suspension while extending the rear suspension. The extension of the rear suspension system un-weights the rear wheel and tends to reduce rear tire traction. The reduction in rear tire traction adversely affects braking power in that, if the rear tire traction is sufficiently reduced, the rear tire may be allowed to slide along the ground surface. Such an event can distract a rider and may adversely affect the rider's ability to maintain control of the bicycle. If the loss of rear tire traction during braking, or skid, is unanticipated by the rider, the rider may even crash. Accordingly, it is also desired to provide a suspension system that enhances the attitude of the bicycle during braking so as to provide at least partial compression of the suspension system through a majority of braking conditions.

Another consideration to bicycle construction is bicycle maintenance. Occasionally, wheels, tires, tubes or other components of a bicycle need replacing or periodic servicing. Although front wheel assemblies are generally equipped with a quick release or the like, rear wheel assemblies are generally require more time and attention to service. For multi-speed bikes, a gear set is commonly associated with the rear wheel and is operatively engaged with a chain of the bicycle. The gear set includes a number of gears of varying diameters that alter the mechanical advantage associated with peddling the bicycle. A derailleur is generally engaged with the chain in close proximity to the gear set and manipulates the chain to facilitate smooth transitioning of the chain between the various gears of the gear set.

The derailleur is also generally associated with maintaining a desired tension of the chain. The derailleur commonly includes a movable arm that is biased away from the gear set. As the chain is moved along the gear set from a smaller gear to a larger gear, the chain deflects the arm of the derailleur against the bias force to accommodate the chain path associated with the larger gear. As the chain is moved along the gear set from a larger gear to a smaller gear, the bias force maintains the desired tension of the chain to maintain smooth interaction between the gear of the crankset and the gears of the gear set. The gear set, the derailleur, and the chain, and the interaction therebetween complicate any maintenance task that is performed on the rear wheel assembly.

Commonly, removing the rear wheel either requires or results in removal of the derailleur assembly from the bicycle. The manipulation of multiple independent parts complicates the assembly and construction of the rear wheel assembly. That is, the user must orient or otherwise associate the multiple parts to ensure proper operation of the wheel system when assembled and attached to the bicycle. Doing so can be a time consuming, challenging, and sometimes frustrating endeavor. Accordingly, it is further desired to provide a bicycle wheel assembly with a robust derailleur system that is generally aligned with a rear wheel axis and that is independently engageable with the bicycle assembly.

BRIEF DESCRIPTION OF THE INVENTION

The present invention provides a frame assembly, suspension system, and derailleur assembly that overcome one or more of the aforementioned drawbacks. A frame according to a number of the aspects of the invention includes a number of interconnected rotatable members that are configured to absorb shocks and impacts associated with operation of the bicycle. The suspension system includes a chain stay and a seat stay pivotably connected to a frame constructed to support a rider. A rearward axis of rotation of the chain stay and the seat stay are generally concentrically orientated with respect to an axis of rotation of a rear wheel, i.e. a rear wheel axle. Such a construction provides a suspension system that is highly tunable as well as configured to maintain operation of the rear wheel braking system throughout a majority of the travel range of the rear wheel suspension system.

A derailleur according to a further aspect of the invention is constructed to be pivotably connected to the suspension system such that the derailleur pivots about an axis that is aligned with the axis of rotation of the rear wheel. The derailleur is independently secured to the suspension system such that the rear wheel can be removed from the bicycle without interfering with the attachment of the derailleur to the bicycle.

Another aspect of the invention discloses a bicycle assembly having a number of movable suspension members and a derailleur assembly that is secured to the bicycle assembly aligned with an axis of rotation of the movable members. The bicycle derailleur assembly includes a body and a pair of guide members for steering a bicycle chain. The pair of guide members is secured to the body such that each of the pair of guide members can rotate relative to the body. The assembly includes a pivot having a first end for engaging the body and a second end for engaging a bicycle frame. The pivot is connected to the body and the bicycle frame such that the body is rotatable about an axis generally aligned with a wheel axis and such that a wheel associated with the axis is removable from the bicycle frame independent of the body. Such an assembly allows the rear wheel to be removed from the bicycle without otherwise interfering with the derailleur assembly.

Yet another aspect of the invention discloses a bicycle assembly having a main frame portion and a first link and a second link extending rearward of the main frame portion. The second link includes a first end that extends away from a point of the main frame portion that is offset from the first link and a second end. The second end extends rearward from the main frame portion toward the first link. An axle provides an axis of rotation and is engaged with the first link and the second link. A wheel is attached to a gear set that is engaged with a chain. The wheel is attached to the gear set such that rotation of the gear set rotates the wheel about the axis of rotation. A derailleur is engaged with the chain and is attached to the bicycle assembly about the axis of rotation and axially offset from the axle. Such a bicycle assembly provides a derailleur system that is robust and can withstand the rigors associated with extended operation.

An even further aspect of the invention discloses a bicycle assembly having a frame with a first portion for supporting a rider. A first and a second arm extend rearward of the first portion. The assembly includes a pivotable connection between the first arm and the second arm. An axle is engaged with the first arm and the second arm and has an axis that is aligned with the pivotable connection between the first arm and the second arm. A derailleur that is pivotable about the axis of the axle is secured to one of the first arm and the second arm independent of the axle such that the axle can be removed without affecting connection of the derailleur to the bicycle. Such a construction provides a robust derailleur system without unnecessarily complicating bicycle maintenance.

These and various other aspects, features, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
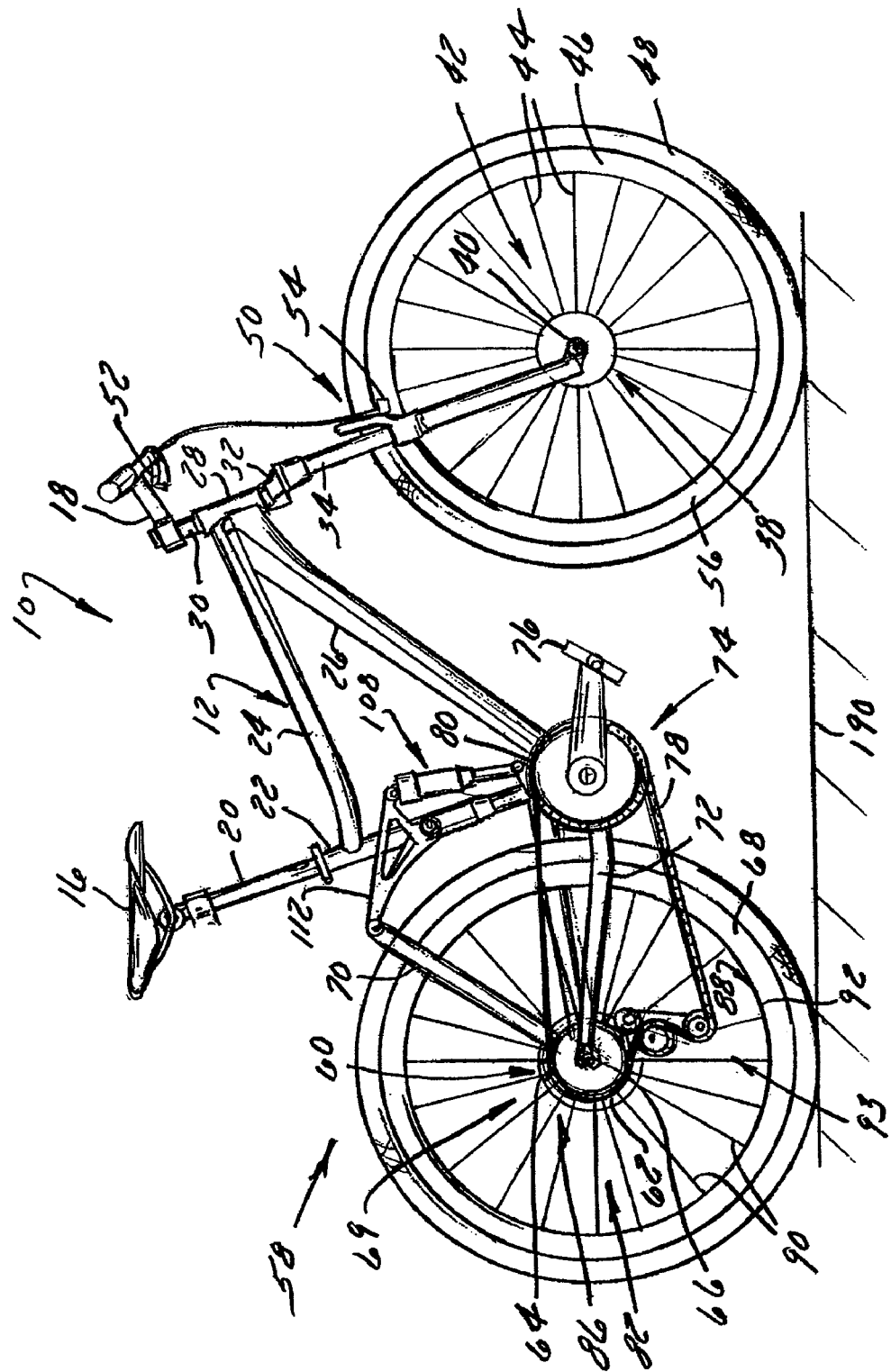
FIG. 1 is an elevational view of a bicycle equipped with a frame, a suspension system, and a derailleur system according to the present invention.

FIG. 1 shows a bicycle 10 having a frame assembly 12 equipped with a rear wheel suspension system according to the present invention. Bicycle 10 includes a seat 16 and handlebars 18 that are attached to frame assembly 12. A seat post 20 is connected to seat 16 and slidably engages a seat tube 22 of frame assembly 12. A top tube 24 and a down tube 26 extend forwardly from seat tube 22 to a head tube 28 of frame assembly 12. Handlebars 18 are connected to a stem 30 that passes through head tube 28 and engages a fork crown 32. A pair of forks 34 extend from generally opposite ends of fork crown 32 and are constructed to support a front wheel assembly 36 at an end of each fork or a fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebars 18 and a pair of brake pads 54 positioned on generally opposite sides of front wheel assembly 36. Brake pads 54 are constructed to engage a brake wall 56 of rim 46 thereby providing a stopping or slowing force to front wheel assembly 36. A rear wheel assembly 58 includes a disc brake assembly 60 having a rotor 62 and a caliper 64 that are positioned proximate a rear axle 66. A rear wheel 68 is positioned generally concentrically about rear axle 66. Understandably, front wheel assembly 36 and rear wheel assembly 58 could be equipped with a brake assembly generally similar to front brake assembly 50 or disc brake assembly 60.

A rear wheel suspension system 69 is pivotably connected to frame 12 to allow rear wheel 68 to move independent of seat 16 and handlebars 18. Suspension system 69 includes a seat stay 70 and a chain stay 72 that offset rear axle 66 from a crankset 74. Crankset 74 includes a pedal 76 that is operationally connected to a chain 78 via a chain ring or sprocket 80. Rotation of chain 78 communicates a drive force to a rear section 82 of bicycle 10. A gear cluster 84 is positioned at rear section 82 and engaged by chain 78. Gear cluster 84 is generally concentrically orientated with respect to rear axle 66 and includes a number of variable diameter gears. Gear cluster 84 is operationally connected to a hub 86 of a rear wheel 88 of rear wheel assembly 58. A number of spokes 90 extend radially between hub 86 and a rim 92 of rear wheel 88. As is commonly understood, rider operation of pedals 76 drives chain 78 thereby driving rear wheel 88 which in turn propels bicycle 10. As described further with respect to FIGS. 7-9, a derailleur assembly 93 is secured to bicycle 10 and engages chain 78 to laterally translate chain 78 relative to gear cluster 84. The lateral translation of chain 78 to engage chain 78 with different gears of gear cluster 84 is commonly referred to as shifting.

Figure 2:
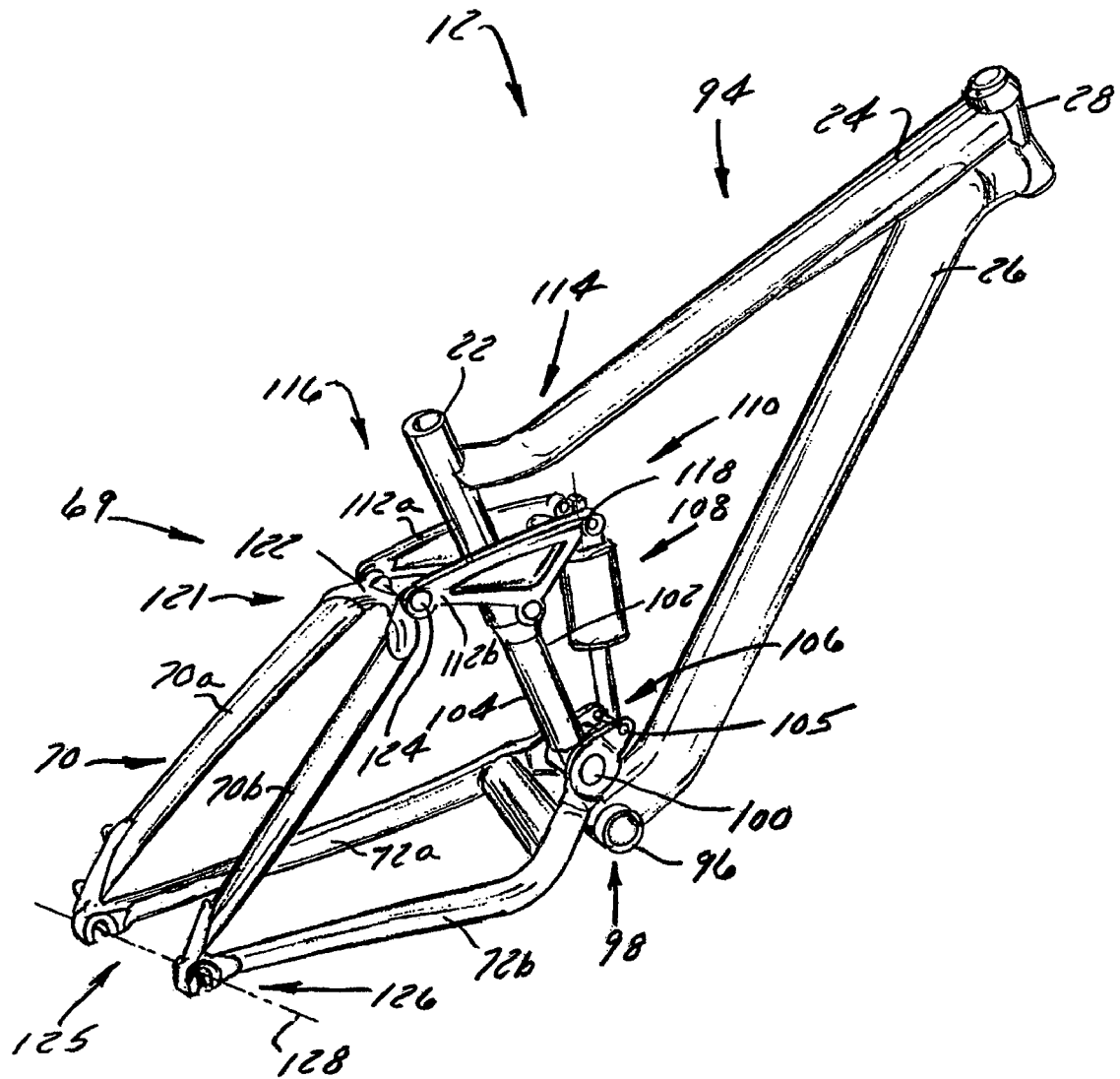
FIG. 2 is a perspective view of the frame assembly shown in FIG. 1.

As shown in FIG. 2, frame assembly 12 includes a first portion 94 that generally includes seat tube 22, top tube 24, down tube 26, and head tube 28. A bottom bracket 96 is formed proximate the interface of seat tube 22 and down tube 26 and is constructed to operatively connect crankset 74 to bicycle frame assembly 12. A first end 98 of chain stay 72 is pivotably connected to seat tube 22 proximate bottom bracket 96. A pivot pin 100 passes through seat tube 22 generally between a forward edge 102 and a rearward edge 104 of seat tube 22. Pivot pin 100 pivotably connects alternate side chain stays 72a, 72b to seat tube 22. A portion 105 of chain stays 72a, 72b extends forward of seat tube 22 and is constructed to engage a first end 106 of an absorber, or shock absorber 108. A second end 110 of shock absorber 108 is pivotably connected to a rocker arm 112 that is pivotably connected to seat tube 22. Preferably, shock absorber 108 is a gas shock absorber configured to contain a compressed volume of gas. Other absorber constructions, such as a spring-based absorber or a fluid-based shock absorber are envisioned and within the scope of the claims.

Rocker arm 112 includes a first portion 114 that extends forward of seat tube 22 and a second portion 116 that extends rearwardly from seat tube 22. A pivot pin 118 secures rocker arm 112 to seat tube 22 and a web wall 120 extends between generally opposite sides 112a, 112b of rocker arm 112 such that opposite sides 112a, 112b of rocker arm 112 generally flank seat tube 22. Second portion 116 of rocker arm 112 extends rearward from seat tube 22 and is pivotably connected to a first end 121 of seat stay 70. Seat stay 70 includes generally opposite sides 70a, 70b that are connected at first end 121 by a bracket 122. A pivot pin 124 pivotably connects second portion 116 of rocker arm 112 to first end 121 of seat stays 70a, 70b.

A second end 125 of seat stays 70a, 70b is pivotably connected to a second end 126 of chain stays 72a, 72b. An axis of rotation between seat stays 70a, 70b and chain stays 72a, 72b, indicated by line 128, is generally concentrically oriented to rear axle 66. That is, rear axle 66, seat stays 70a, 70b, and chain stays 72a, 72b are connected to be rotatable about a common axis, i.e. axis 128.

Figure 3:
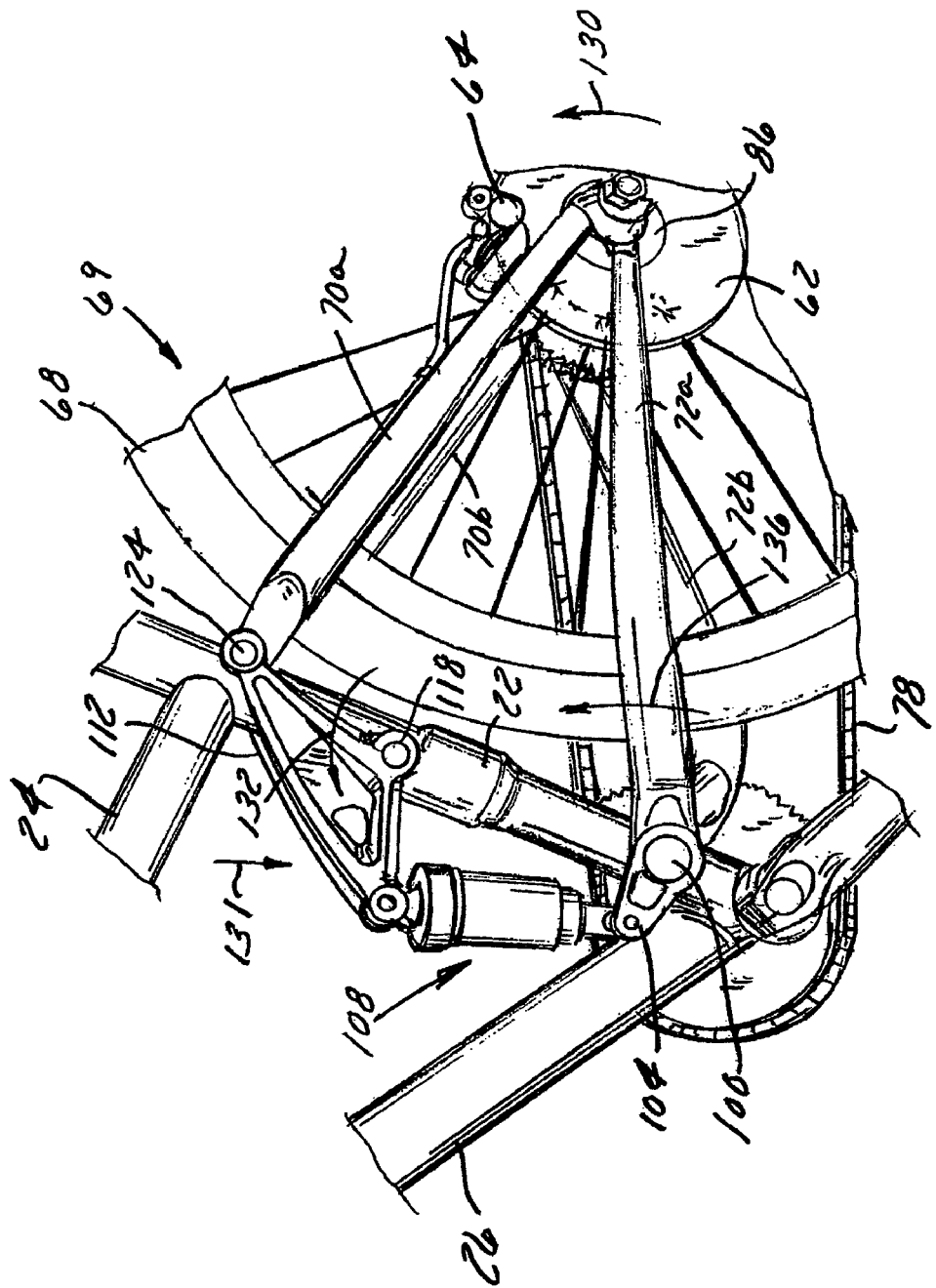
FIG. 3 is an elevational view of a portion of the bicycle shown in FIG. 1 with the suspension system in a compressed position.
Figure 4:
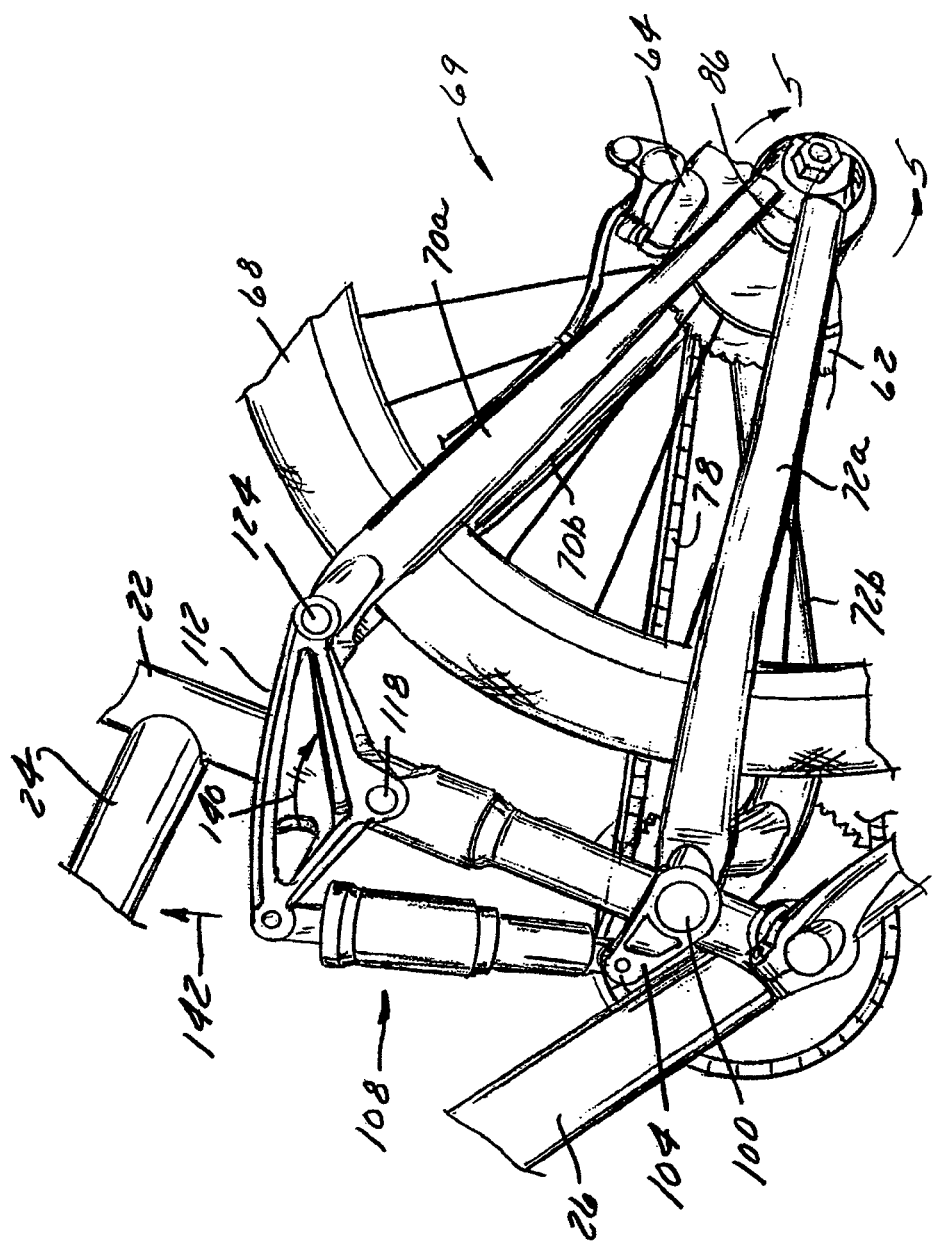
FIG. 4 is a view similar that shown in FIG. 3 with the suspension system in an extended position.

As shown in FIGS. 3 and 4, in addition to the relative rotation between seat stays 70a, 70b and chain stays 72a, 72b, seat stays 70a, 70b are also rotatable relative to rocker arm 112 about pivot pin 124. Chain stays 72a, 72b are also rotatable relative to seat tube 22 about pivot pin 100. As shown in FIG. 3, when subjected to an impact, that portion of suspension system 69 rearward of seat tube 22 rotates generally upward, indicated by arrow 130. This action rotates rocker arm 112 about pivot pin 118 in the direction indicated by arrow 132 thereby subjecting shock absorber 108 to a compressive force, indicated by arrow 134. During this same movement of rocker arm 112, chain stays 72a, 72b rotate in the direction indicated by arrow 136 about pivot pin 100. This action displaces forward portion 105 of chain stays 72a, 72b in the same direction as force 134 thereby allowing a portion of force 134 to be absorbed by the mechanical association of seat stays 70a, 70b and chain stays 72a, 72b.

As shown in FIG. 4, when rear wheel 68 overcomes an obstacle or other impact, suspension system 69 returns to a generally unloaded orientation such that there is a collective rotation of rocker arm 112, seat stays 70, and chain stays 72 in the direction, indicated by arrow 140. Rotation 140 is associated with the restoring force, indicated by arrow 142, generated by shock absorber 108.

Still referring to FIGS. 3 and 4, rotor 62 of brake assembly 60 is attached to hub 86 of rear wheel 68. Actuation of caliper 64 engages the pads of caliper 64 with rotor 62 thereby imparting a stopping force to wheel 68. Caliper 64 is fixedly connected to seat stay 70 such that, during a breaking operation, suspension system 69 is allowed to move in a primarily upward direction rather than a rearward direction. Such a configuration allows suspension system 69 to maintain the attitude of bicycle 10 during a braking operation by limiting the compression of shock absorber 108 by maintaining the weighting of rear wheel 68.

Figure 5:
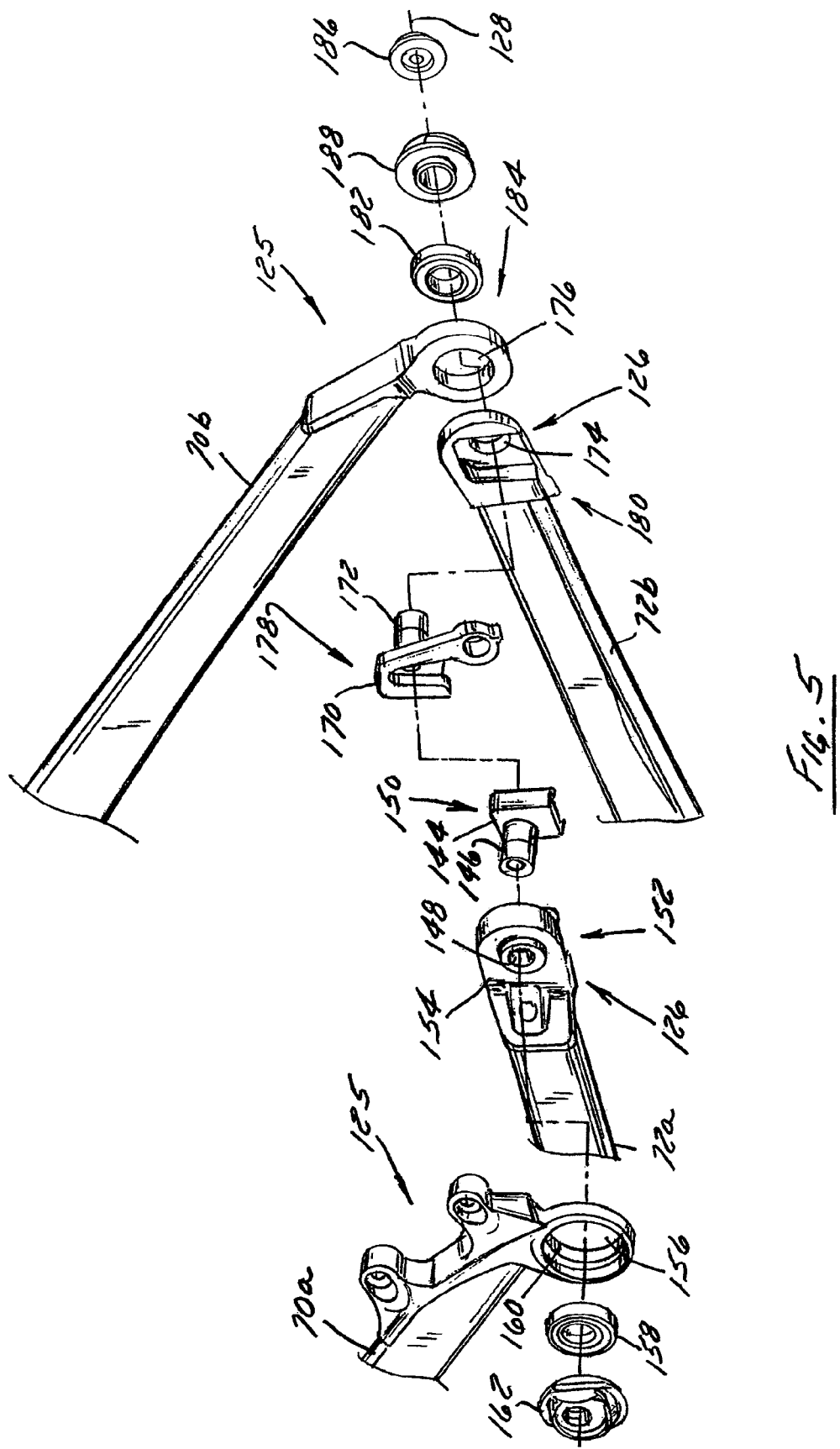
FIG. 5 is an exploded view of a portion of the suspension system generally along line 5-5 shown in FIG. 4.

FIG. 5 shows an exploded view of the assembly of the coaxial connection of seat stays 70a, 70b and chain stays 72a, 72b. A first insert 144 includes a stem 146 that is constructed to pass into an opening 148 formed in second end 126 of chain stay 72a. Insert 144 includes a contour 150 that is constructed to generally correspond to a contour 152 formed in second end 126 of chain stay 72a proximate opening 148. A lip 154 is formed about opening 148 and extends from a side of chain stay 72a generally opposite insert 144. Lip 154 is constructed to generally align opening 148 of chain stay 72a and an opening 156 formed in second end 125 of seat stay 70a. Such a construction ensures the generally concentric and coaxial alignment of chain stay 72a and seat stay 70a with axis of rotation 128. Second end 125 of seat stay 70a is constructed to receive a bearing 158 within a cavity 160 formed in second end 125.

An end cap 162 engages axle 66 so as to secure bearing 158 in cavity 160. Bearing 158 and opening 148 of chain stay 72a are constructed to engage stem 146 of insert 144 such that chain stay 72a and seat stay 70a a rotate independently about axis 128. Such a construction allows for independent and coaxial rotation of seat stay 70a and chain stay 72a relative to axis 128. Similarly, a second insert 170 includes a stem 172 that is constructed to pass through an opening 174 formed in chain stay 72b and an opening 176 formed in seat stay 70b. Insert 170 includes a contour 178 that generally corresponds to a contour 180 of second end 126 of chain stay 72b. Such a mating orientation prevents rotation of second insert 170 relative to chain stay 72b. A bearing 182 engages a cavity 184 formed in second end 125 of seat stay 70b and engages stem 172 of insert 170. An end cap 186 and a spacer 188 are positioned proximate bearing 182 and configured to engage stem 172 of insert 170. Spacer 188 is constructed to generally enclose bearing 182 within cavity 184 and prevents dirt or other debris from fouling bearing 182.

When fully assembled, rear wheel assembly 58 is constructed to be received between insert 144 and insert 170. Rear wheel assembly 58 is rotatably supported by an axle whose axis of rotation is coincident with axis 128. It is further appreciated that the axis 128 forms an axis of rotation of rear wheel assembly 58, seat stays 70a, 70b, and chain stays 72a, 72b, through the range of motion of the moveable members of rear suspension system 69.

Figure 6:
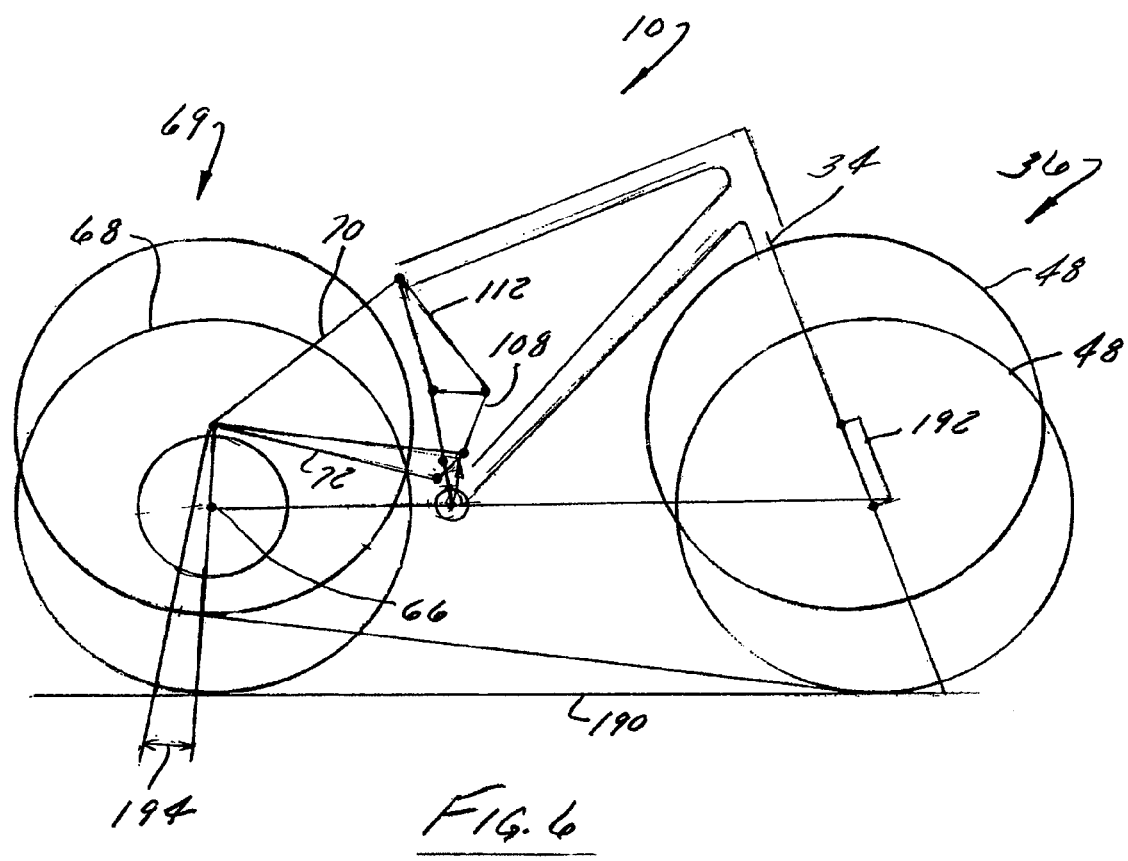
FIG. 6 is a geometric representation of the movement of the suspension of the frame assembly shown in FIG. 2.

FIG. 6 shows a geometrical representation of the operation of suspension system 69. As shown in FIG. 5, as bicycle 10 traverses terrain, indicated by line 190 a shock absorber 192 of front fork 34 absorbs impacts experienced by front wheel assembly 36 thereby allowing the front tire 48 to deflect over the obstruction. A large portion of the shock or impact experienced by rear wheel 68 is absorbed by the collective operation and movement of seat stays 70, chain stays 72, rocker arm 112, and shock absorber 108. Wheel 68 has a normal operation contact patch 194 that is generally centrally positioned beneath the axis of rotation of axle 66. During braking, the concentric orientation of the pivot axis of seat stays 70 relative to chain stays 72 provides for both the substantially vertical translation of axle 66 and a substantially reduced range of translation of contact patch 194 through the movable range of suspension system 69. Preferably, contact patch 194 translates from about 0 to about 7 degrees for a suspension system having about 75 mm to about 250 mm of translation. Understandably, other ranges of contact patch rotation and suspension system travel are envisioned. Accordingly, suspension system 69 provides enhanced operation of the braking system throughout the travel range of the suspension system thereby providing a bicycle that is responsive to the dynamic riding conditions as well as enjoyable to ride.

Figure 7:
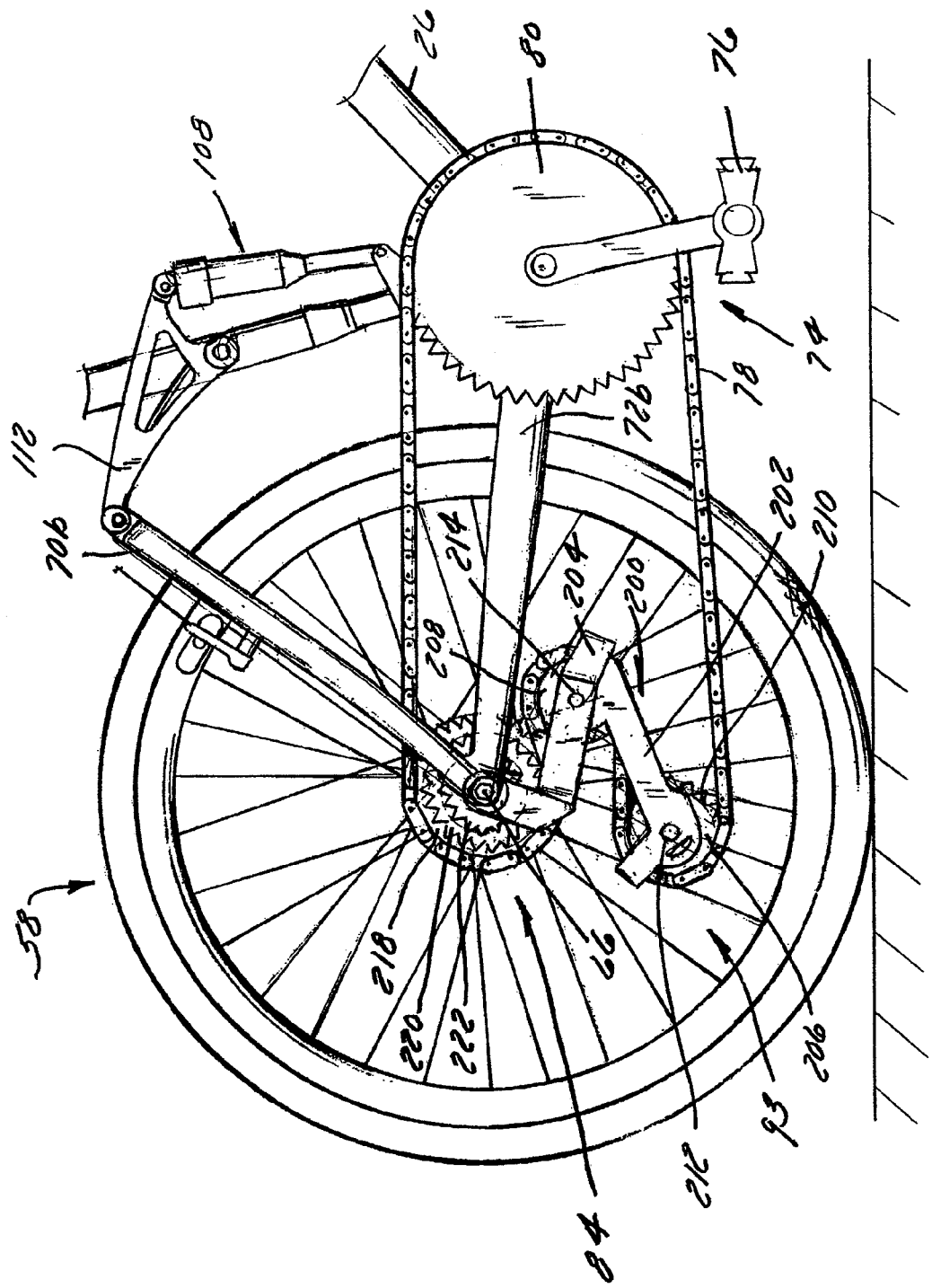
FIG. 7 is a detailed elevational view of the derailleur assembly shown in FIG. 1.

Referring to FIG. 7, derailleur assembly 93 includes a body 200 having a first portion 202 that is pivotably connected to a second portion 204. Derailleur assembly 93 includes a first guide member 206 and a second guide member 208 that each engage chain 78. A number of teeth 210 extend from each of guide members 206, 208 and engage corresponding cavities associated with chain 78. A first pivot 212 secures first guide member 206 to first portion 202 of body 200 such that guide member 206 can rotate relative thereto. A second pivot 214 secures second guide member 208 to body 200. Chain 78 passes about gear cluster 84 and first and second guide members 206, 208 in a generally serpentine manner. Chain 78 operationally engages chain ring sprocket 80 such that rotation of pedals 76 rotates chain 78 about the gears of gear cluster 84, and through derailleur assembly 93 about guide members 206, 208.

Gear cluster 84 includes a number of variable diameter gears 218, 220, 222 configured to alter the mechanical advantage associated with the operation of pedals 76. It is appreciated that although three gears 218, 220, 222 are shown and chain ring sprocket 80 is shown as a single gear, other configurations are envisioned such as two or more gears associated with either of gear cluster 84 or chain ring sprocket 80. Lateral translation of guide member 206 or guide member 208 relative to rear axle 66 and gear cluster 84 provides a lateral force to chain 78 thereby translating chain 78 between the multiple gears 218, 220, 222 of gear cluster 84. Derailleur assembly 93 is pivotably secured about the axis associated with rear axle 66 and is positioned outboard of seat stay 70b and chain stay 72b. Derailleur assembly 93 is connected to bicycle 10 to be pivotable about rear axle 66 such that derailleur 93 maintains a generally uniform tension of chain 78 when chain 78 is engaged with any of the gears 218, 220, 222 of gear cluster 84.

Figure 8:
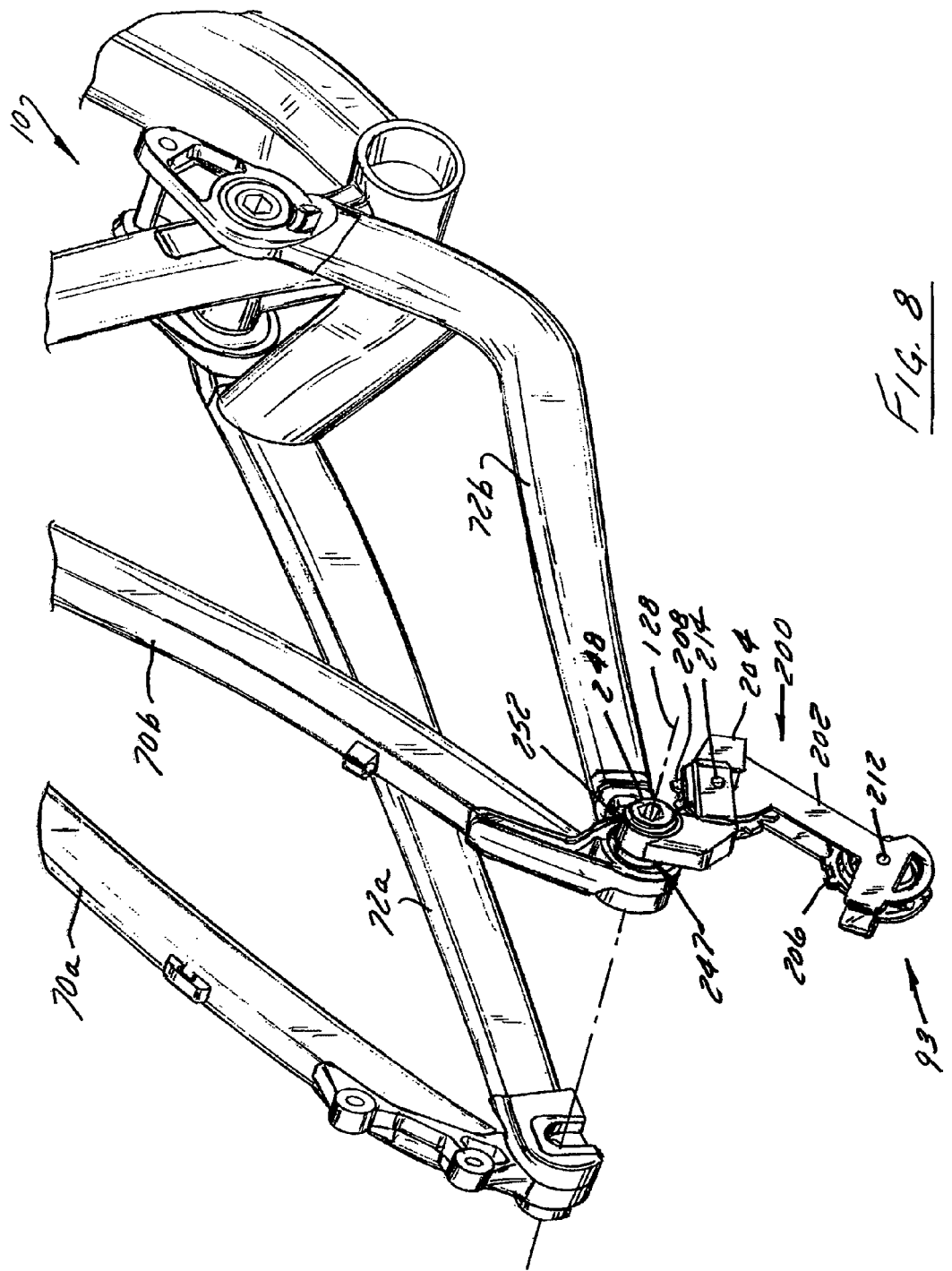
FIG. 8 is a perspective view of the derailleur assembly shown in FIG. 7.

Referring to FIG. 8, derailleur assembly 93 is secured to bicycle 10 independent of rear axle 66. As shown in FIG. 8, rear wheel assembly 58, including rear wheel 68, gear cluster 84, and rear axle 66, has been removed from bicycle 10 while derailleur assembly 93 remains attached thereto. Derailleur assembly 93 is attached to bicycle 10 so as to be rotatable about axis 128, or the axis of rotation of rear wheel assembly 58. Derailleur assembly 93 is rotatable about axis 128 and independently securable to bicycle 10 relative to axle 66 by being offset in the axial direction along axis 128 associated with axle 66.

Figure 9:
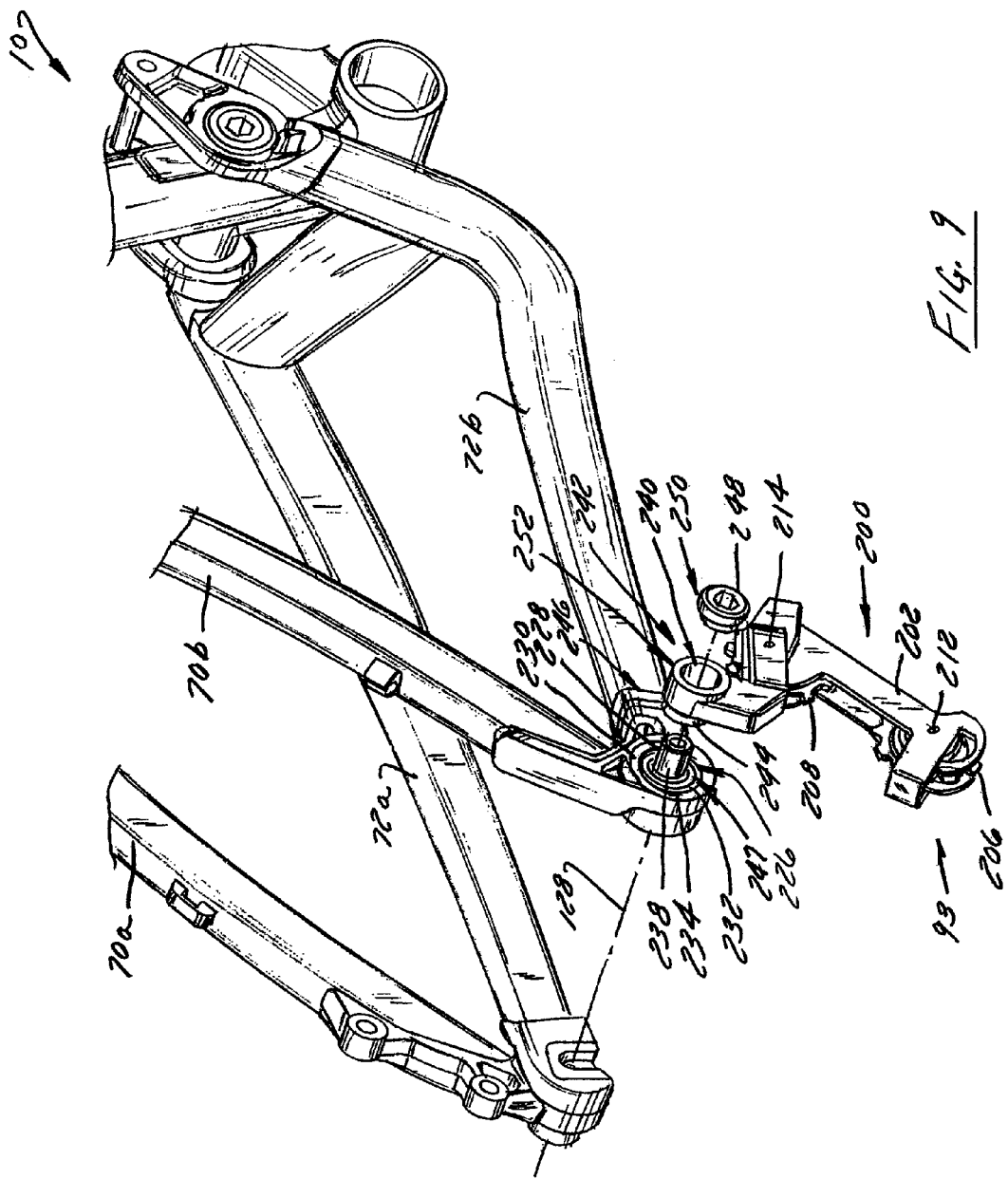
FIG. 9 is a view similar to FIG. 8 with the derailleur assembly exploded from the bicycle frame assembly.

Referring to FIG. 9, a pivot 226 includes a first end 228 that extends outwardly from an outboard face 230 of seat stay 70b. A second end 232 of pivot 226 is received within a cavity 234 formed in seat stay 70b. Such a construction ensures axial alignment of pivot 226, rear wheel axle 66, and axis 128. An outer surface 238 of first end 228 of pivot 226 slidably engages a bore 240 formed through a first end 242 of body 200 of derailleur assembly 93. A rib 244 is formed on an inboard facing side 246 of body 200 proximate first end 242. A groove 247 is formed about pivot 226 and is constructed to cooperate with rib 244 to enhance the co-axial engagement between pivot 226 and bore 240. A cap 248 engages pivot 226 and secures body 200 of derailleur assembly 93 to bicycle 10. Cap 248 includes a land 250 that cooperates with an outboard face 252 of end 242 of body 200. Cap 248 could include interior or exterior threading configured to cooperate with a threading of pivot 226. Alternatively, cap 248 and pivot 226 could be configured to cooperate with and receive a fastener for securing cap 248 to pivot 226. Regardless of the mode and/or means of connection, cap 248 and pivot 226 cooperate to pivotably secure body 200 of derailleur assembly 93 to bicycle 10.

Rib 244 and groove 247, the axial length of outer surface 238 of first end 228 of pivot 226, and the engagement of land 250 of cap 248 with outboard face 252 of body 200 each function to ensure that body 200 is secured to bicycle 10 for rotation about axis 128. Furthermore, aligning the axis of rotation of derailleur assembly 93 relative to bicycle 10 with the axis of rotation of rear wheel assembly 66, and therefore gear cluster 84, reduces the offset between the engagement of chain 78 and guide members 206, 208 relative to the axis of rotation of body 200 and localizes the forces associated with the operation of derailleur assembly 93 along an axis associated with the origin of the forces, i.e. the engagement of chain 78 with a respective gear 218, 220, 222 of gear cluster 84. Such a construction provides a robust derailleur assembly 93 that is lightweight and highly compact.

A bicycle frame assembly according to a combination of aspects of the invention includes a number of rotatable members configured to absorb shocks and impacts associated with operation of the bicycle. The assembly includes a frame constructed to support a rider and a chain stay having a rearward end that extends toward a wheel hub and a forward end that is pivotably connected to the frame. An absorber is pivotably connected to the forward end of the chain stay and extends to a rocker arm that is pivotably connected to the frame. A seat stay is pivotably connected to a rearward end of the rocker arm and extends to the rearward end of the chain stay. The rearward ends of the seat stay and the chain stay are pivotably connected to rotate about a common axis. Such a construction provides a bicycle suspension system that has an absorbing member that is not rigidly connected to a fixed frame member as well as a suspension system with enhanced operation throughout a range of operating positions of the members of the suspension system. The suspension system maintains a reduced contact patch of the rear wheel over the range of motion of the suspension system thereby enhancing operation of the bicycle.

Even with the suspension features discussed above, derailleur assembly 93 allows a rider to quickly and conveniently remove rear wheel assembly 58 from bicycle 10 without affecting the engage of derailleur assembly 93 with bicycle 10. Such an assembly simplifies routine bicycle maintenance and/or service by allowing a rider to remove only those systems which require servicing. The concentric association of the engagement of derailleur assembly 93 with bicycle 10 and axis of rotation 128 of rear wheel assembly 58 provides a derailleur assembly that is lightweight and robust.

A bicycle constructed in accordance with one or more aspects of the present invention provides an impact absorbing suspension with beneficial braking performance, provides a suspension system wherein a seat stay and a chain stay are pivotable about an axis aligned with an axis of rotation of the rear wheel, and is equipped with a derailleur assembly that is robust and reduces the time and/or effort associated with removing and/or replacing the bicycle rear wheel assembly by maintaining it's engagement with the bicycle in an orientation concentric to the rear wheel axle independent of the real wheel axle's engagement with the bicycle.

Therefore, one embodiment includes a bicycle derailleur assembly having a body with a pair of guide members for steering a bicycle chain. The pair of guide members is secured to the body such that each of the pair of guide members can rotate relative to the body. The assembly includes a pivot having a first end for engaging the body and a second end for engaging a bicycle frame. The pivot is connected to the body and the bicycle frame such that the body is rotatable about an axis generally aligned with a wheel axis and such that a wheel associated with the axis is removable from the bicycle frame independent of the body.

Another embodiment includes a bicycle assembly having a main frame portion and a first link and a second link extending rearward of the main frame portion. The second link includes a first end that extends away a point of the main frame portion that is offset from the first link and a second end. The second end extends rearward from the main frame portion toward the first link. An axle provides an axis of rotation and is engaged with the first link and the second link. A wheel is attached to a gear set that is engaged with a chain. The wheel is attached to the gear set such that rotation of the gear set rotates the wheel about the axis of rotation. A derailleur is engaged with the chain and is attached to the bicycle assembly about the axis of rotation and axially offset from the axle.

A further embodiment includes a bicycle assembly having a frame with a first portion for supporting a rider. A first and a second arm extend rearward of the first portion. The assembly includes a pivotable connection between the first arm and the second arm. An axle is engaged with the first arm and the second arm and has an axis that is aligned with the pivotable connection between the first arm and the second arm. A derailleur that is pivotable about the axis of the axle is secured to one of the first arm and the second arm independent of the axle such that the axle can be removed without affecting connection of the derailleur.

The present invention has been described in terms of the preferred embodiment, and it is recognized that equivalents, alternatives, and modifications, aside from those expressly stated, are possible and within the scope of the appending claims.

What is claimed is:

1. A bicycle assembly comprising:
   a main frame portion;
   a first link extending rearward from the main frame portion;
   a second link having a first end extending away from a point of the main frame portion that is offset from the first link and a second end extending rearward from the main frame portion toward the first link;
   an axle providing an axis of rotation and engaged with the first link and the second link;
   a gear set engaged with a chain;
   a wheel attached to the gear set such that rotation of the gear set rotates the wheel about the axis of rotation; and
   a derailleur engaged with the chain and attached to the bicycle assembly about the axis of rotation and axially offset from the axle and attached to one of the first or second links about the axis of rotation independent of the axle.

2. The bicycle assembly of claim 1 further comprising a rocker arm pivotably connected to the first end of the second link, pivotably connected the main frame portion, and pivotably connected to an arrestor.

3. The bicycle assembly of claim 2 wherein the arrestor is positioned forward of a seat tube of the main frame portion and the second link engages the rocker arm rearward of the main frame portion.

4. The bicycle assembly of claim 1 wherein the first link, the second link, and the derailleur are pivotable about a common axis.

5. The bicycle assembly of claim 1 further comprising a pivot aligned with the axle and extending in a direction away from the gear set for engaging the derailleur.

6. The bicycle assembly of claim 5 further comprising a lug engaged with the pivot and the derailleur such that the pivot and lug engage from generally opposite sides of the derailleur.

7. The bicycle assembly of claim 1 further comprising another first link and another second link attached to the bicycle assembly such that the first links and the second links generally flank the wheel.

8. The bicycle assembly of claim 1 wherein the derailleur further comprises a pair of gears constructed to interact with the chain such that lateral translation of a portion of the derailleur biases the chain laterally relative to gear set.

9. A bicycle assembly comprising:
a frame having a first portion for supporting a rider;
a first arm extending rearward of the first portion;
a second arm extending rearward of the first portion;
a pivotable connection between the first arm and the second arm;
an axle engaged with the first arm and the second arm and having an axis that is aligned with the pivotable connection between the first arm and the second arm; and
a derailleur pivotable about the axis and secured to one of the first arm and the second arm independent of the axle such that the axle can be removed without affecting connection of the derailleur.

10. The bicycle assembly of claim 9 further comprising a wheel engaged with the axle and rotatable about the axis.

11. The bicycle assembly of claim 10 further comprising another first arm and another second arm that are pivotably connected to pivot above the axis of the axle.

12. The bicycle frame of claim 9 further comprising a stem engaged with one of the first arm and the second arm, the stem being aligned with the axle and engaged with a bore formed in the derailleur.

13. The bicycle frame of claim 12 further comprising a cap constructed to engage the stem for securing the derailleur about the pivot.

* * * * *